Sept. 7, 1943.   E. H. LAMBERGER ET AL   2,329,121
DEVICE FOR MEASURING TWISTS OF LOADED SHAFTS
Filed Feb. 28, 1941   3 Sheets-Sheet 1

INVENTORS
Edward H. Lamberger &
Bernard F. Langer
BY
Paul E. Friedemann
ATTORNEY Sept. 7, 1943. E. H. LAMBERGER ET AL 2,329,121
DEVICE FOR MEASURING TWISTS OF LOADED SHAFTS
Filed Feb. 28, 1941 3 Sheets—Sheet 2
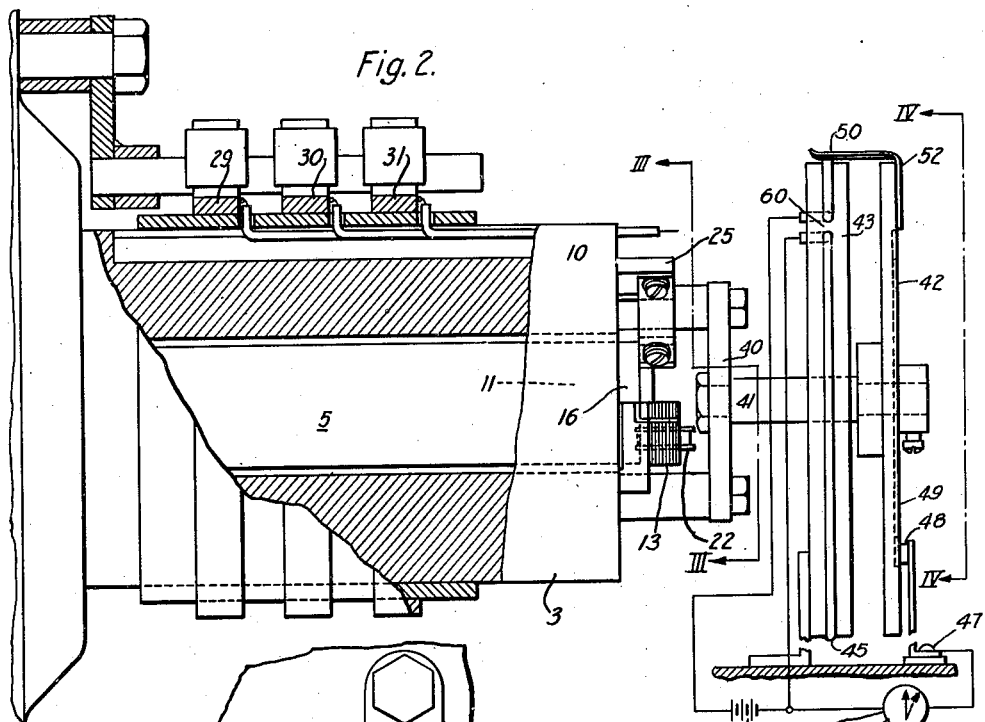
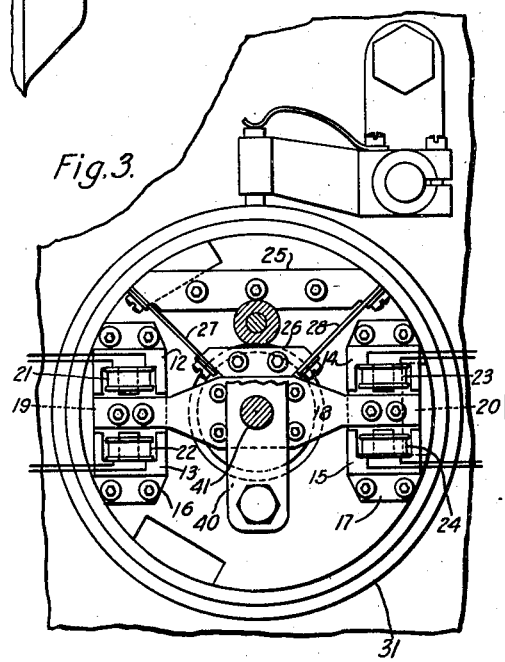
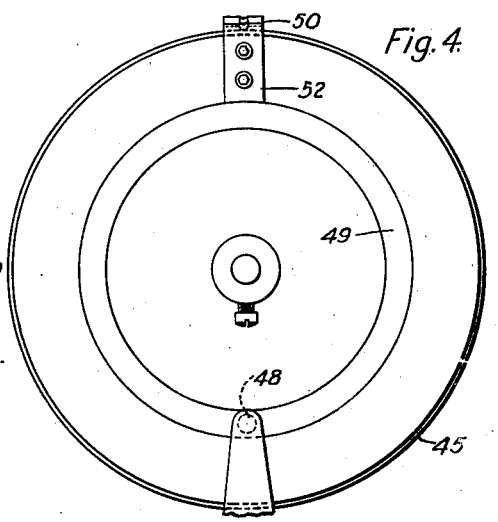
WITNESSES:
INVENTORS
Edward H. Lamberger &
Bernard F. Langer
BY
Paul E. Friedemann
ATTORNEY Sept. 7, 1943.     E. H. LAMBERGER ET AL     2,329,121
DEVICE FOR MEASURING TWISTS OF LOADED SHAFTS
Filed Feb. 28, 1941     3 Sheets-Sheet 3
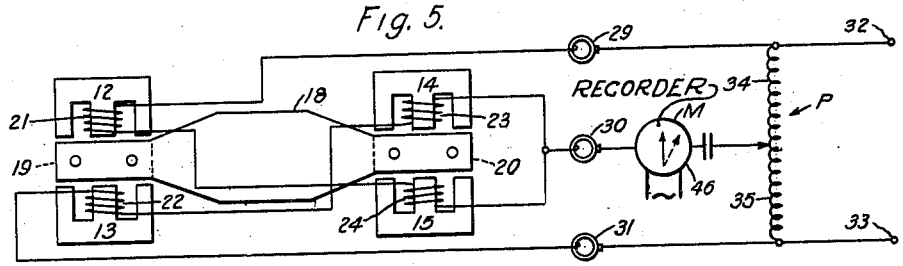
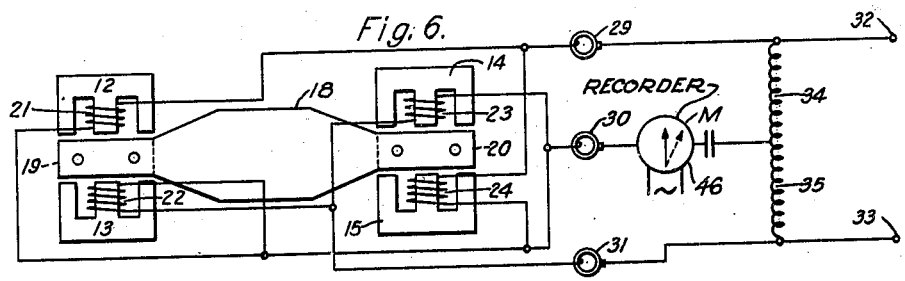
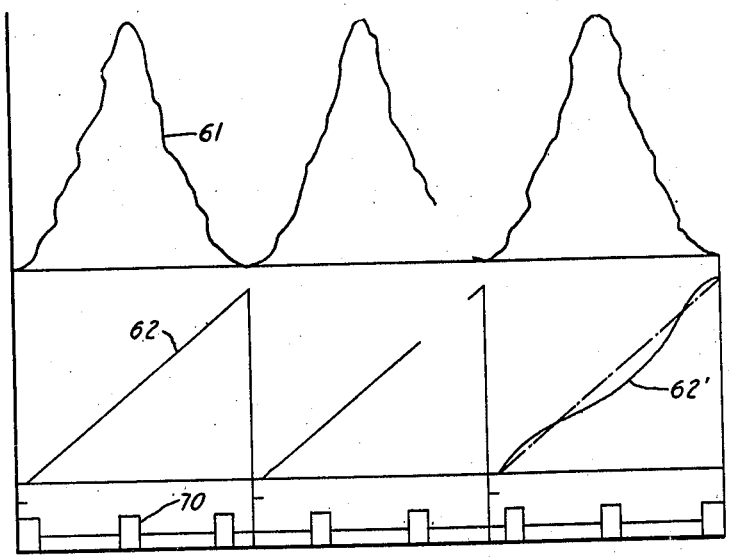
WITNESSES:
INVENTORS
Edward H. Lamberger &
Bernard F. Langer
BY
ATTORNEY Patented Sept. 7, 1943

2,329,121

UNITED STATES PATENT OFFICE 2,329,121

DEVICE FOR MEASURING TWISTS OF LOADED SHAFTS

Edward H. Lamberger, Wilkinsburg, and Bernard F. Langer, Pittsburgh, Pa., assignors to Westinghouse Electric & Manufacturing Company, East Pittsburgh, Pa., a corporation of Pennsylvania Application February 28, 1941, Serial No. 381,156

8 Claims. (Cl. 265—25)

Our invention relates to devices for indicating the torque and other operating characteristics of a loaded shaft and more particularly to electromagnetic means in combination with structures for measuring the torque and other operating characteristics of a shaft in relation to the angular position of the shaft relative to a reference plane including the shaft axis. Our invention has special utility with shafts having only limited access.

One object of our invention is the provision of indicating the torque or variations thereof on a shaft loaded either by a variable or constant load.

Another object of our invention is the provision of measuring the torque variations on a shaft for each position of the shaft during one rotation of the shaft.

Another object of our invention is the provision of means for indicating and recording the torque variations on an intermittently loaded shaft as the shaft rotates.

The objects specifically stated are merely illustrative. Other objects and advantages will, no doubt, become apparent from a study of the following specification and the accompanying drawings, in which:

Fig. 2 shows a side view with some parts in section of an end of a shaft, such as shown by way of example in Fig. 1, provided with certain elements of our invention;

Fig. 3 shows an end view, on the section line III—III of the subject matter shown in Fig. 2;

Fig. 4 shows an end view, viewed from line IV—IV of Fig. 2, of certain other features of our invention;

Figs. 5 and 6 are diagrammatic showings of the electrical and magnetic circuits used in our device; and Fig. 7 is a showing of records of the torque variations on a shaft in relation to time and also the rotation, that is, angular position of the shaft.

Figure 1:
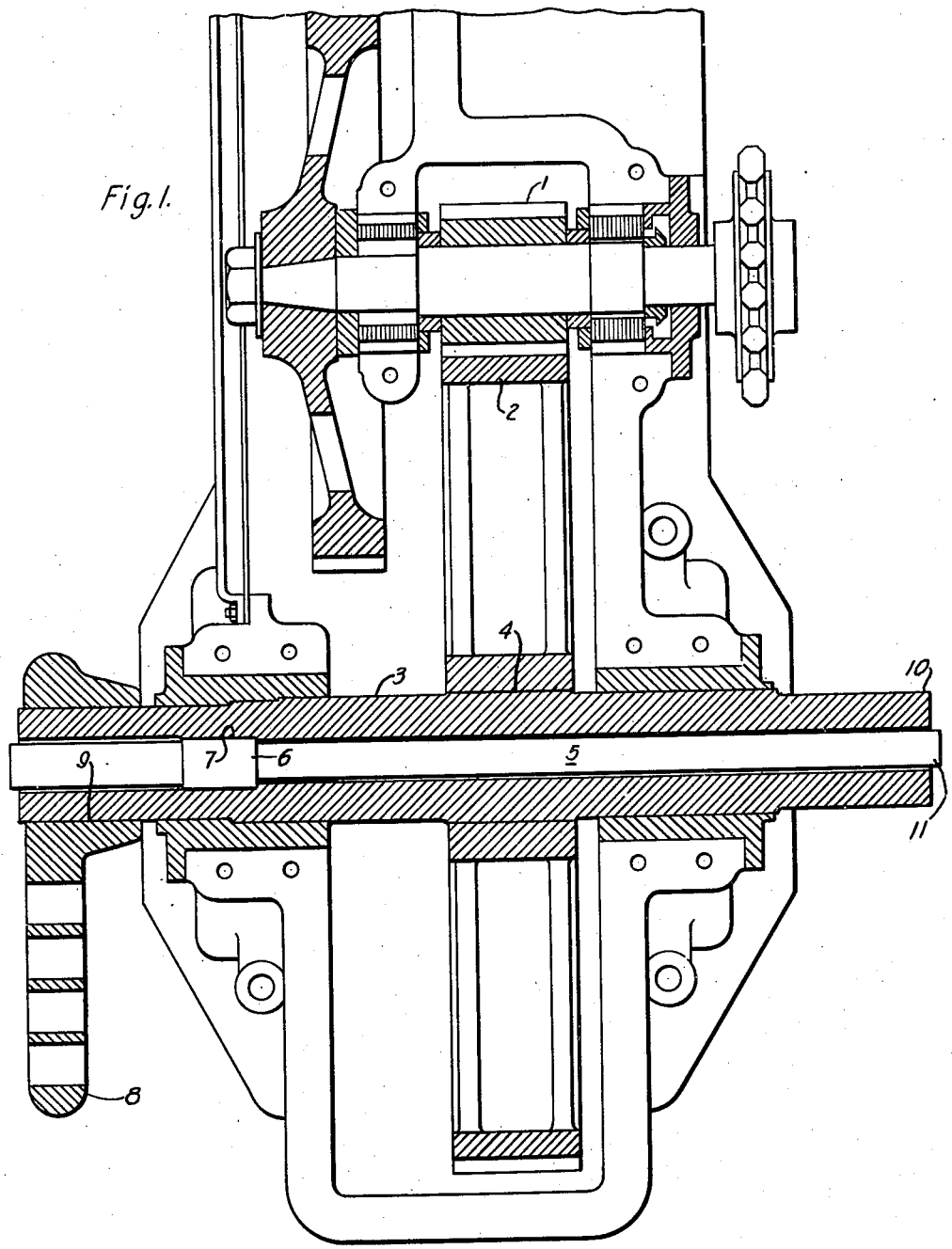
Figure 1 shows a horizontal sectional view of an oil well pump drive.

It is usually desirable to be able to measure the torque of a rotating shaft under load, but when the load is cyclic, or nearly cyclic, widely varying, and is suspected of being subjected to high peak values of short duration, it becomes particularly desirable and important to have some reliable means for indicating and recording such torque loads and variations in loads. To be able to accurately determine the torque loads is important as to the shaft itself but more than that is also important as to members mounted on the shaft or connected to the shaft as gears, crank arms, connecting rods, couplings, propellers, etc.

In Fig. 1, we have shown a specific application, namely an oil well pumping equipment, wherein our device is very useful, however, our device is not limited to oil well pumping equipment. Our device is of special utility with shafts accessible at one end only as shafts of gear transmission systems, and others. Of course, our device is not limited to shafts accessible at one end only but may also be used with any shaft where at least one end is available. For instance locomotive axles and many shafts in transmission gear systems are available at both ends, whereas a ship propeller shaft has only the end at the gear box available.

In addition to measuring torque values, it is often important to know at what angular position of the shaft the peak values or variations in torque occur. Our device includes means for measuring constant and varying torques and also means for determining the torque variations in relation to the angular position of the shaft in relation to a reference plane including the shaft axis.

In Fig. 1 we show a transmission gear for an oil well pumping equipment. The engine, or motor (not shown), through suitable means drives pinion 1, which in turn drives the spur gear 2 rigidly attached to the shaft 3 at region 4.

The shaft 3 is hollow bored (not necessarily but preferably to the full length as shown) to some relatively small diameter. This relatively small hole along the center of the shaft reduces the strength of the shaft in torsion as well as bending. This reduction in strength is negligible, however. In fact large shafts are very often hollow board to reduce the shaft weight, and also to permit inspection of the shaft.

Into this central hole, we fit a reference shaft 5. This reference shaft has a portion 6 which is of such a diameter as to afford a secure press fit within the main shaft 3 at region 7. Except for this press fit section, this reference shaft is of sufficiently smaller diameter to assure adequate clearance between it and the main shaft.

The reference shaft 5 is selected to have sufficient rigidity so that it does not come in contact, other than at region 7, with the main shaft under operating conditions. In case of long shafts, locomotive axles or ship propeller shafts, the reference shaft may be supported by antifriction bearings. It is not necessary that the reference shaft be solid as shown but a pipe construction may be used. The free end of the reference shaft may also be supported at its free end so that relative rotation between the reference shaft and the main shaft is not affected.

In Fig. 1, the driven member is a crank arm 8 for operating the walking beam, mounted on the Samson post, and thus the sucker rod of the oil well pumping equipment. The crank arm 8 is rigidly secured to the shaft at 9 whereas the driving gear 2 is secured at 4. This means that as load is applied at 9 to shaft 3, there will be relative angular displacement between regions 4 and 7 about the longitudinal axis of the shaft. The displacement will be proportional to the load on the shaft.

The free end 10 of the main shaft 3 will be in the same angular position as region 4. The free end 11 of the reference shaft 5, on the other hand will be in the same angular position as region 7. It is thus clear that for any given location of region 7 between regions 4 and 9, there will always be a relative angular displacement between the shaft ends 10 and 11, while stationary or while rotating, proportional to the torsional load on the shaft.

Should the press fit or region 7 be centered at region 9 or located to the left of 9, then the angular displacement between 10 and 11 would be equal to the total angular displacement (shaft twist) along the shaft. By locating the region 4 closer to the end 10 any desired smaller portion of the total shaft twist may be made available between the shaft ends 10 and 11. To measure the relative angular displacement between shaft ends 10 and 11, we provide a special arrangement of two magnetic strain gages.

The two magnetic strain gages are so mounted on the shaft ends 10 and 11 as to accurately measure the relative motion between them. The mountings may be better understood from a reference to Figs. 2, 3, and 4. Laminated cores 12, 13, 14 and 15, of generally E shape are, by suitable means, such as bolts, secured to the shaft end 10 and spaced from such shaft end by the non-magnetic blocks 16 and 17. The center legs of the E shaped cores are provided with magnetizing coils 21, 22, 23, and 24 as shown in Figs. 2, 3, 5 and 6.

Bolted to the end 11 of the reference shaft 5 is the non-magnetic cross bar 18 carrying a pair of laminated armatures 19 and 20. This bar 18 is bolted in the axis of rotation of shaft 3. When relative angular motion takes place between ends 10 and 11, the air gaps between 12 and 19 and between 15 and 20 increase and the air gaps between 13 and 19 and 14 and 20 decrease or vice versa, depending on whether the shaft end 11 moves counterclockwise with reference to shaft end 10 or moves clockwise with reference to shaft end 10.

This changes the reluctance of the magnetic paths in the four iron cores and as a consequence changes the impedances of the coils 21, 22, 23, and 24 wound on them. By the use of four gages mounted as shown, we obtain automatic compensation for any translational motion of the reference shaft relative to the main shaft. Thus, if the end 11 of the reference shaft were able to sag slightly, the two upper air gaps, for the position shown, would increase but the two lower air gaps would correspondingly decrease.

It is apparent, therefore, by proper grouping of the coils, automatic compensation is obtained. By associating coil 21 with coil 24 in one leg of a Wheatstone bridge circuit and by associating coils 22 and 23 in the other leg of a Wheatstone bridge circuit, there is thus in each pair of associated coils one with increased air gap and one with decreased air gap. Thus, if the reference shaft should sag, in each pair of associated coils there is one coil with increased impedance and one coil with decreased impedance so that the two circuits remain balanced insofar as shaft sag is concerned. The associated coils may be connected in series, as shown in Fig. 5, or in parallel as shown in Fig. 6.

However, to eliminate as much as possible any movements of the end 11 of shaft 5 with reference to the end 10 of shaft 3 other than angular motion, we mount the end 11 on the end 10 of shaft 3. A block 25 is bolted to end 10 and a block 26 is bolted to end 11. These two blocks are secured to each other by means of leaf springs 27 and 28. These springs are sufficiently rigid to form either compression structure or tension structure to thus hold the shaft 5 centralized, regardless of the angular positions these springs may hold with reference to a plane of reference including the axis of shaft 3. The springs are, however, sufficiently resilient transverse their longitudinal directions so as to permit free relative angular motion of the ends 10 and 11. That is, no radial motion of shaft 5 can take place, since the extension of springs 27 and 28 intersect at the common axis of shafts 3 and 5, yet angular motion is free.

To properly energize the coils 21, 22, 23, and 24, the shaft end 10 is provided with the brush and slip ring structure shown in Figs. 2 and 3. The connection is not shown in these figures because that will become clear from a study of the circuits shown in Figs. 5 and 6. The slip rings are designated by the reference characters 29, 30 and 31.

In Figs. 5 and 6 a source of alternating current is indicated by buses 32 and 33. An adjustable center-tap potentiometer impedance is shown at P having the portions 34 and 35. The circuits are thus simple Wheatstone bridge circuits. In Fig. 5, coils 21 and 24, connected in series, constitute one leg, coils 22 and 23, connected in series, constitute another leg, and the portions 34 and 35 of the potentiometer constitute the other legs whereas in Fig. 6 coils 21 and 24 are connected in parallel and coils 22 and 23 are connected in parallel. Otherwise Figs. 5 and 6 are the same.

The recording meter M records the variations of torque. The recording meter may be of any well known type that will work in the circuit shown. The curve this meter records may take any shape depending on the type of load driven. For a given oil well pumping equipment tested, the curve was similar to that shown by upper curve in Fig. 7. The meter may also be of the indicating type.

To correlate the torque curve with the shaft movement, we provide still further equipment mounted at the ends 10 and 11. A cross bar 40 is bolted to the end 10 of shaft 3, and to this cross bar is bolted a stud 41 for supporting contact carrying disc 42 having the contact pointer 52. The stud 41 extends through an annular disc-like member 43 carrying, in a peripheral groove, a high resistance resistor 45 of very near zero temperature coefficient. The resistor, consisting preferably of a single solid wire, extends, except for a small gap, over substantially 360° of the disc 43.

A battery B is interconnected with the resistor 45 as shown, and a recording voltmeter 46, in structure constituting part of recording meter 46, is connected to one junction of the battery thence to a binding post 47, a brush 48, a slip ring 49 to the contact point 50 and then back to the battery through a portion of resistor 45. The amount of resistance included in the circuit of the recording meter depends on the angular position of pointer 52. The voltage thus recorded by the meter will vary as indicated by the lower curve 62 shown in Fig. 7. This curve 62, since the disc 43 is stationary and pointer 52 moves with shaft 3, thus indicates the position of crank arm 8 and as correlated in Fig. 7 shows the torque variations in relation to shaft position and in relation to time. Note the timing wave 70. In practice the two records are made on the same recording sheet driven at a constant speed. That is meter 46, meter M, and a clock mechanism for driving a recording sheet at a constant speed are combined in one structure. Such recording meters are well known in the art and need not be described in detail. The timing wave 70 may be produced in any well known manner. Since the recording mechanism may be operated by a timing device as a clock, it is evident that the timing wave 70 may constitute the graduations at the edge of the recording sheet. If, as is sometimes the case for recording meters, the recording sheet is not operated strictly in accordance with time, then a timing fork may be used to actuate a pointer for marking the timing wave, as 70, on the recording sheet.

The pointer 52 may be set for any desired angular position of the shaft 3 so that the pointer 52 passes over the gap at 60 at a desired crank position. The two curves 61 and 62 are then in the most logical relation as shown in Fig. 7.

Assuming a recording type of instrument 46 including a constant speed chart, then any deviation of the shaft motion line (the lower curve 62 in Fig. 7) from a straight line will also indicate a variation in speed of main shaft 3. Should reversal of direction of rotation occur, this will be indicated by reversal of the slope of the shaft motion line. This variation in speed is shown at the right at curve 62'.

From the foregoing disclosure, it will be apparent that we provide apparatus by means of which the shaft torque is measured by means originating within the shaft itself and which means are rugged and reliable.

With our device, especially where but one end of the shaft is available, there is no interference with normal service, there is no interference with the normal use and arrangement of the shaft in the mechanical system, and no extra intermediate elements are required in the mechanical system.

Our arrangement further makes it possible to directly apply magnetic strain gages with the result that accurate measurements of high frequency torque variations may be made. Further, our particular arrangement of magnetic strain gages for measuring torque is applicable in cases where the cylindrical surface of the shaft is not available for mounting instruments thereon, but one end of the shaft is available.

Further, the combination of the slide wire device and the torque device provides means for determining the angular position of the shaft for any torque value or variation therein and for showing any variation of shaft speed or reversal of rotation.

The foregoing disclosure and the showings made with the description are merely illustrative of the principles of our invention and are not to be interpreted in a limiting sense. The only limitations are to be determined from the appended claims in which we claim as our invention:

1. In a system for measuring the twist in a predetermined length of a shaft, in combination, a shaft concentric within said shaft, the inner shaft being rigidly so connected to the outer shaft at a region to the left of the right-hand ends of the concentric shafts that the portion of the inner shaft to the right of the said rigid connection is disposed in spaced relation to the outer shaft and terminates in the region of the right-hand end of the outer shaft; means for applying a force couple of a given rotational sense to the outer shaft at a region to the right of said rigid connection; means for applying a force couple of an opposite rotational sense to the outer shaft at a region to the left of the region of the application to the outer shaft of the first mentioned force couple, whereby any twist in the outer shaft between the regions of the applications of the two force couples will produce a relative rotation of the right-hand ends of the concentric shafts; a first electromagnetic member, having an energizing coil, mounted on the right-hand end of the outer shaft; a second electromagnetic member, having an energizing coil, disposed in spaced facing relation to the first electromagnetic member also mounted on the outer shaft; a third electromagnetic member, having an energizing coil, mounted on the outer shaft; a fourth electromagnetic member, having an energizing coil, disposed in spaced facing relation to the third electromagnetic member also mounted on the outer shaft; a pair of magnetic members, one disposed in the space between the first and second electromagnetic members and the other disposed in the space between the third and fourth magnetic members, mounted on the inner shaft; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter connected to the output terminals of the Wheatstone bridge for recording the variations in relative rotation of the right-hand ends of the concentric shafts by reason of the action of said force couplings, to thus measure the twist in that predetermined length of the outer shaft between the region of connection of said inner shaft to said outer shaft and the region of connection of said first mentioned force couple to said outer shaft.

2. In a system for measuring the twist in a predetermined length of a shaft, in combination, a shaft concentric within said shaft, the inner shaft being rigidly so connected to the outer shaft at a region to the left of the right-hand ends of the concentric shafts that the portion of the inner shaft to the right of the said rigid connection is disposed in spaced relation to the outer shaft and terminates in the region of the right-hand end of the outer shaft; means for applying a force couple of a given rotational sense to the outer shaft at a region to the right of said rigid connection; means for applying a force couple of an opposite rotational sense to the outer shaft at a region to the left of the region of the application to the outer shaft of the first mentioned force couple, whereby any twist in the outer shaft between the regions of the applications of the two force couples will produce a relative rotation of the right-hand ends of the concentric shafts; a first electromagnetic member, having an energizing coil, mounted on the right-hand end of one of the concentric shafts; a second electromagnetic member, having an energizing coil, disposed in a spaced facing relation to the first electromagnetic member mounted on the same shaft as the first electromagnetic member; a third electromagnetic member, having an energizing coil, mounted on the same shaft as the first electromagnetic member; a fourth electromagnetic member, having an energizing coil, disposed in spaced facing relation to the third electromagnetic member also mounted on the same shaft as the first electromagnetic member; a pair of magnetic members, one disposed in the space between the first and second electromagnetic members and the other disposed in the space between the third and fourth magnetic members, mounted on the right-hand end of the other one of said concentric shafts; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils, and a meter connected to the output terminals of the Wheatstone bridge for measuring the variations in relative rotation of the right-hand ends of the concentric shafts by reason of the action of said force couplings, to thus measure the twist in that predetermined length of the outer shaft between the region of connection of said inner shaft to said outer shaft and the region of connection of said first mentioned force couple to said outer shaft.

3. In a system for measuring the twist in a predetermined length of a shaft, in combination, a shaft concentric within said shaft, the inner shaft being rigidly so connected to the outer shaft at a region to the left of the right-hand ends of the concentric shafts that the portion of the inner shaft to the right of the said rigid connection is disposed in spaced relation to the outer shaft and terminates in the region of the right-hand end of the outer shaft; a pair of leaf springs disposed at an angle to each other and radially disposed of the common axes of the two shafts, the outer ends of the springs being rigidly secured to the outer shaft and the inner ends being rigidly secured to the inner shaft, whereby free relative rotation of the right-hand ends of the shafts is permitted but the inner shaft is prevented, by reason of its tendency to sag, from moving out of the axial alignment of the axis of the outer shaft; means for applying a force couple of a given rotational sense to the outer shaft at a region to the right of said rigid connection; means for applying a force couple of an opposite rotational sense to the outer shaft at a region to the left of the region of the application to the outer shaft of the first mentioned force couple, whereby any twist in the outer shaft between the regions of the applications of the two force couples will produce a relative rotation of the right-hand ends of the concentric shafts; a first electromagnetic member, having an energizing coil, mounted on the right-hand end of the outer shaft; a second electromagnetic member, having an energizing coil, disposed in spaced facing relation to the first electromagnetic member also mounted on the outer shaft; a third electromagnetic member, having an energizing coil, mounted on the outer shaft; a fourth electromagnetic member, having an energizing coil, disposed in spaced facing relation to the third electromagnetic member also mounted on the outer shaft; a pair of magnetic members, one disposed in the space between the first and second electromagnetic members and the other disposed in the space between the third and fourth magnetic members, mounted on the inner shaft; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter connected to the output terminals of the Wheatstone bridge for recording the variations in relative rotation of the right-hand ends of the concentric shafts by reason of the action of said force couplings, to thus measure the twist in that predetermined length of the outer shaft between the region of connection of said outer shaft to said inner shaft and the region of connection of said first mentioned force couple to said outer shaft.

4. In a system for measuring the twist in a predetermined length of a shaft, in combination, a shaft concentric within said shaft, the inner shaft being rigidly so connected to the outer shaft at a region to the left of the right-hand ends of the concentric shafts that the portion of the inner shaft to the right of the said rigid connection is disposed in spaced relation to the outer shaft and terminates in the region of the right-hand end of the outer shaft; a pair of leaf springs disposed at an angle to each other and radially disposed of the common axes of the two shafts, the outer ends of the springs being rigidly secured to the outer shaft and the inner ends being rigidly secured to the inner shaft, whereby free relative rotation of the right-hand ends of the shafts is permitted but the inner shaft is prevented, by reason of its tendency to sag, from moving out of the axial alignment of the axis of the outer shaft; means for applying a force couple of a given rotational sense to the outer shaft at a region to the right of said rigid connection; means for applying a force couple of an opposite rotational sense to the outer shaft at a region to the left of the region of the application to the outer shaft of the first mentioned force couple, whereby any twist in the outer shaft between the regions of the applications of the two force couples will produce a relative rotation of the right-hand ends of the concentric shafts; a first electromagnetic member, having an energizing coil, mounted on the right-hand end of one of the concentric shafts; a second electromagnetic member, having an energizing coil, disposed in a spaced facing relation to the first electromagnetic member mounted on the same shaft as the first electromagnetic member; a third electromagnetic member, having an energizing coil, mounted on the same shaft as the first electromagnetic member, a fourth electromagnetic member, having an energizing coil, disposed in spaced facing relation to the third electromagnetic member also mounted on the same shaft as the first electromagnetic member; a pair of magnetic members, one disposed in the space between the first and second electromagnetic members and the other disposed in the space between the third and fourth magnetic members, mounted on the right-hand end of the other one of said concentric shafts; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils, and a meter connected to the output terminals of the Wheatstone bridge for measuring the variations in relative rotation of the right-hand ends of the concentric shafts by reason of the action of said force couplings, to thus measure the twist in that predetermined length of the outer shaft between the region of connection of said outer shaft to said inner shaft and the region of connection of said first mentioned force couple to said outer shaft.

5. In a system for measuring the twist in a predetermined length of a main rotating shaft, in combination, a shaft concentric within said shaft, the inner, or reference shaft, being rigidly so connected to the outer, or main, shaft at a region to the left of the right-hand ends of the concentric shafts that the portion of the inner shaft to the right of the said rigid connection is disposed in spaced relation to the outer shaft and terminates in the region of the right-hand end of the outer shaft; means for applying a force couple of a given rotational sense to the outer shaft at a region to the right of said rigid connection and of a magnitude sufficient to rotate the outer and inner shafts; means for applying a force couple of an opposite rotational sense to the outer shaft at a region to the left of the region of the application to the outer shaft of the first mentioned force couple, whereby any twist in the outer shaft, between the regions of the applications of the two force couples will produce a relative rotation of the right-hand ends of the concentric shafts; a first electromagnetic member, having an energizing coil, mounted on the right-hand end of the outer shaft; a second electromagnetic member, having an energizing coil, disposed in spaced facing relation to the first electromagnetic member also mounted on the outer shaft; a third electromagnetic member, having an energizing coil, mounted on the outer shaft; a fourth electromagnetic member, having an energizing coil, disposed in spaced facing relation to the third electromagnetic member also mounted on the outer shaft; a pair of magnetic members, one disposed in the space between the first and second electromagnetic members and the other disposed in the space between the third and fourth magnetic members, mounted on the inner shaft; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter comprising a first and a second recording device and a constant speed recording chart, said first recording device of said meter being connected to the output terminals of the Wheatstone bridge for graphically recording on said constant speed chart the variations in relative rotation of the right-hand ends of the concentric shafts by reason of the action of said force couplings, to thus measure the twist in that predetermined length of the outer shaft between the region of connection of the outer shaft to the inner shaft and the region of connection of the first mentioned force couple to the outer shaft, means for producing a pulsating voltage corresponding to the angular motion of said outer shaft and having a frequency which is the equal of the revolutions per minute of said outer shaft, circuit means interconnecting said means for producing a pulsating voltage with said second recording device of said meter whereby the shaft angular motion is graphically recorded on said constant speed chart adjacent said graphic recording of the variations in relative rotation of the right-hand ends of the concentric shafts, the combination of said graphic recordings providing an indication of the angular shaft position for any given torque.

6. In a system for measuring the twist in a predetermined length of a main rotating shaft, in combination, a shaft concentric within said shaft, the inner, or reference shaft, being rigidly so connected to the outer, or main, shaft at a region to the left of the right-hand ends of the concentric shafts that the portion of the inner shaft to the right of the said rigid connection is disposed in spaced relation to the outer shaft and terminates in the region of the right-hand end of the outer shaft; a pair of leaf springs disposed at an angle to each other and radially disposed of the common axes of the two shafts the outer ends of the springs being rigidly secured to the outer shaft and the inner ends being rigidly secured to the inner shaft, whereby free relative rotation of the right-hand ends of the shafts is permitted but the inner shaft is prevented, by reason of its tendency to sag, from moving out of the axial alignment of the axis of the outer shaft; means for applying a force couple of a given rotational sense to the outer shaft at a region to the right of said rigid connection and of a magnitude sufficient to rotate the outer and inner shafts; means for applying a force couple of an opposite rotational sense to the outer shaft at a region of the left of the region of the application of the outer shaft of the first mentioned force couple, whereby any twist in the outer shaft, between the regions of the applications of the two force couples will produce a relative rotation of the right-hand ends of the concentric shafts; a first electromagnetic member, having an energizing coil, mounted on the right-hand end of the outer shaft; a second electromagnetic member, having an energizing coil, disposed in spaced facing relation to the first electromagnetic member also mounted on the outer shaft; a third electromagnetic member, having an energizing coil, mounted on the outer shaft; a fourth electromagnetic member, having an energizing coil, disposed in spaced facing relation to the third electromagnetic member also mounted on the outer shaft; a pair of magnetic members, one disposed in the space between the first and second electromagnetic members and the other disposed in the space between the third and fourth magnetic members, mounted on the inner shaft; whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter comprising a first and a second recording device and a constant speed recording chart, said first recording device being connected to the output terminals of the Wheatstone bridge for graphically recording on said constant speed chart the variations in relative rotation of the right-hand ends of the concentric shafts by reason of the action of said force couplings, to thus measure the twist in that predetermined length of the outer shaft between the region of connection of the outer shaft to the inner shaft and the region of connection of the first mentioned force couple to the outer shaft, means for producing a pulsating voltage corresponding to the angular motion of said outer shaft and having a frequency which is the equal of the revolutions per minute of said outer shaft, circuit means interconnecting said means for producing a pulsating voltage with said second recording device of said meter whereby the shaft angular motion is graphically recorded on said constant speed chart adjacent said graphic recording of the variations in relative rotation of the right-hand ends of the concentric shafts, the combination of said graphic recordings providing an indication of the angular shaft position for any given torque.

7. In a system for measuring the twist in a predetermined length of a main rotating shaft, in combination, a shaft concentric within said shaft, the inner, or reference shaft, being rigidly so connected to the outer, or main, shaft at a region to the left of the right-hand ends of the concentric shafts that the portion of the inner shaft to the right of the said rigid connection is disposed in spaced relation to the outer shaft and terminates in the region of the right-hand end of the outer shaft; means for applying a force couple of a given rotational sense to the outer shaft at a region to the right of said rigid connection and of a magnitude sufficient to rotate the outer and inner shafts; means for applying a force couple of an opposite rotational sense to the outer shaft at a region to the left of the region of the application to the outer shaft of the first mentioned force couple, whereby any twist in the outer shaft, between the regions of the applications of the two force couples will produce a relative rotation of the right-hand ends of the concentric shafts; a first electromagnetic member, having an energizing coil, mounted on the right-hand end of one of the concentric shafts; a second electromagnetic member, having an energizing coil, disposed in spaced facing relation to the first electromagnetic member mounted on the same shaft as the first electromagnetic member; a third electromagnetic member, having an energizing coil, mounted on the same shaft as the first electromagnetic member; a fourth electromagnetic member, having an energizing coil, disposed in spaced facing relation to the third electromagnetic member also mounted on the same shaft as the first electromagnetic member; a pair of magnetic members, one disposed in the space between the first and second electromagnetic members and the other disposed in the space between the third and fourth magnetic members, mounted on the right-hand end of the other one of said concentric shafts, whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter comprising a first and a second recording device and a constant speed recording chart, said first mentioned recording device of said meter being connected to the output terminals of the Wheatstone bridge for graphically recording on said constant speed chart the variations in relative rotation of the right-hand ends of the concentric shafts by reason of the action of said force couplings, to thus measure the twist in that predetermined length of the outer shaft between the region of connection of the outer shaft to the inner shaft and the region of connection of the first mentioned force couple to the outer shaft, means for producing a pulsating voltage corresponding to the angular motion of said outer shaft and having a frequency which is the equal of the revolutions per minute of said outer shaft, circuit means interconnecting said means for producing a pulsating voltage with said second recording device of said meter whereby the shaft angular motion is graphically recorded on said constant speed chart adjacent said graphic recording of the variations in relative rotation of the right-hand ends of the concentric shafts, the combination of said graphic recordings providing an indication of the angular shaft position for any given torque.

8. In a system for measuring the twist in a predetermined length of a main rotating shaft, in combination, a shaft concentric within said shaft, the inner or reference shaft, being rigidly so connected to the outer, or main, shaft at a region to the left of the right-hand ends of the concentric shafts that the portion of the inner shaft to the right of the said rigid connection is disposed in spaced relation to the outer shaft and terminates in the region of the right-hand end of the outershaft; a pair of leaf springs disposed at an angle to each other and radially disposed of the common axes of the two shafts the outer ends of the springs being rigidly secured to the outer shaft and the inner ends being rigidly secured to the inner shaft, whereby free relative rotation of the right-hand ends of the shafts is permitted but the inner shaft is prevented, by reason of its tendency to sag, from moving out of the axial alignment of the axis of the outer shaft; means for applying a force couple of a given rotational sense to the outer shaft at a region to the right of said rigid connection and of a magnitude sufficient to rotate the outer and inner shafts; means for applying a force couple of an opposite rotational sense to the outer shaft at a region to the left of the region of the application to the outer shaft of the first mentioned force couple, whereby any twist in the outer shaft, between the regions of the applications of the two force couples will produce a relative rotation of the right-hand ends of the concentric shafts; a first electromagnetic member, having an energizing coil, mounted on the right-hand end of one of the concentric shafts; a second electromagnetic member, having an energizing coil, disposed in spaced facing relation to the first electromagnetic member mounted on the same shaft as the first electromagnetic member; a third electromagnetic member, having an energizing coil, mounted on the same shaft as the first electromagnetic member; a fourth electromagnetic member, having an energizing coil, disposed in spaced facing relation to the third electromagnetic member also mounted on the same shaft as the first electromagnetic member; a pair of magnetic members, one disposed in the space between the first and second electromagnetic members and the other disposed in the space between the third and fourth magnetic members, mounted on the right-hand end of the other one of said concentric shafts, whereby any relative rotation of the right-hand ends of the concentric shafts will alter the disposition of said pair of magnetic members with reference to the electromagnetic members to thus alter the impedance of the energizing coils; a Wheatstone bridge circuit having input and output terminals including in one leg an impedance normally, when there is no relative rotation of the right-hand ends of the concentric shafts, matched to the impedance of the coil of the first electromagnetic member and the coil of the fourth electromagnetic member, both connected in a second leg of the Wheatstone bridge, and including in a third leg a second impedance normally, when there is no relative rotation of the right-hand ends of the concentric shafts, matched to the impedance of the coil of the second electromagnetic member and the coil of the third electromagnetic member, both connected in the fourth leg of the Wheatstone bridge; a source of alternating current connected to the input terminals of the Wheatstone bridge to energize the said coils; and a recording meter comprising a first and a second recording device and a constant speed recording chart, said first mentioned recording device being connected to the output terminals of the Wheatstone bridge for measuring the variations in relative rotation of the right-hand ends of the concentric shafts by reason of the action of said force couplings, to thus measure the twist in that predetermined length of the outer shaft between the region of connection of the outer shaft to the inner shaft and the region of connection of the first mentioned force couple to the outer shaft, means for producing a pulsating voltage corresponding to the angular motion of said outer shaft and having a frequency which is the equal of the revolutions per minute of said outer shaft, circuit means interconnecting said means for producing a pulsating voltage with said second recording device of said meter whereby the shaft angular motion is graphically recorded on said constant speed chart adjacent said graphic recording of the variations in relative rotation of the right-hand ends of the concentric shafts, the combination of said graphic recordings providing an indication of the angular shaft position for any given torque.

EDWARD H. LAMBERGER.
BERNARD F. LANGER.